Aug. 11, 1953 H. P. PHILLIPS 2,648,582
PISTON RING
Filed Feb. 12, 1951 2 Sheets-Sheet 1
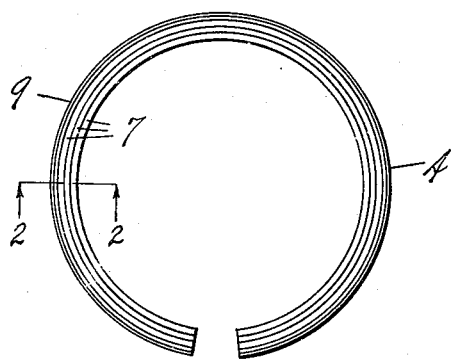
Fig. 1.
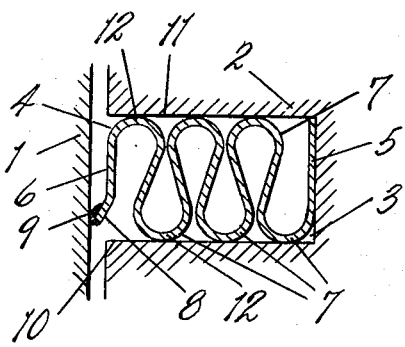
Fig. 2.
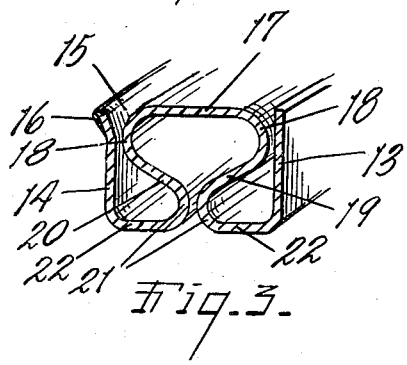
Fig. 3.
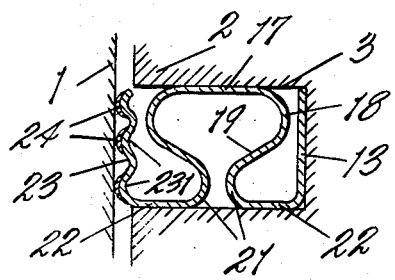
Fig. 5.
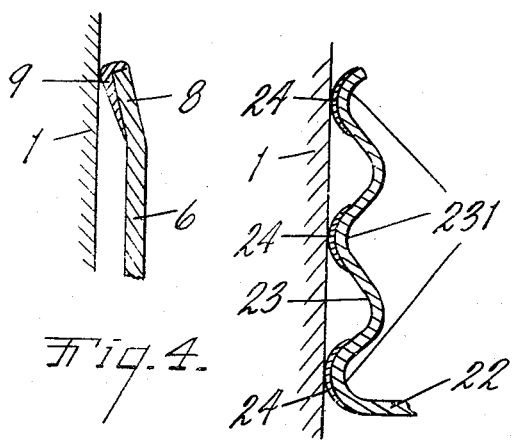
Fig. 4.
Fig. 6.
INVENTOR.
Harold P. Phillips
BY
ATTORNEY.

Aug. 11, 1953 H. P. PHILLIPS 2,648,582
PISTON RING
Filed Feb. 12, 1951 2 Sheets-Sheet 2

INVENTOR.
Harold P. Phillips
BY

Patented Aug. 11, 1953

2,648,582

UNITED STATES PATENT OFFICE 2,648,582

PISTON RING

Harold P. Phillips, Hastings, Mich., assignor to Hastings Manufacturing Company, Hastings, Mich.

Application February 12, 1951, Serial No. 210,494

15 Claims. (Cl. 309—44)

1

This invention relates to improvements in piston rings.

This application is a continuation in part of my application for Letters Patent Serial No. 720,461, filed January 6, 1947, Patent No. 2,569,778.

The main objects of this invention are:

First, to provide a piston ring element formed of ductile metal which can be readily and economically produced and is not likely to be distorted in use and one which eliminates the use of a separate expander.

Second, to provide a piston ring element which may be positioned either to efficiently function as a compression ring or as an oil scraper ring.

Third, to provide a piston ring element having the advantages pointed out which is adapted by bellow-like radial action to exert pressure from the bottom or inner peripheral wall to a cylinder wall with which the ring element coacts.

Objects relating to details and economies of the invention will appear from the description to follow. The invention is pointed out in the claims.

A preferred embodiment of the invention is illustrated in the accompanying drawings, in which:

Fig. 1 is a side elevational view of a ring element embodying my invention.

Fig. 2 is an enlarged fragmentary view in section of the ring element and portions of a cylinder wall and piston showing the ring element in operative relation thereto, the section of the ring element being taken on line 2—2 of Fig. 1.

Fig. 3 is a sectional view of another embodiment of my ring element adapted as a compression ring.

Fig. 4 is an enlarged fragmentary view of the embodiment of my invention illustrated in Fig. 3 showing it in operative relation to a cylinder wall.

Fig. 5 is a fragmentary sectional view corresponding to that of Fig. 2 of a further modification or embodiment of my invention.

Fig. 6 is an enlarged fragmentary view showing the embodiment of my invention shown in Fig. 5 in operative relation to a cylinder wall conventionally illustrated by a line.

Figure 7:
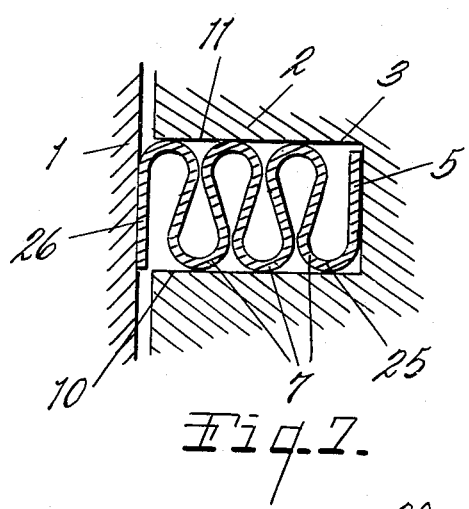
Fig. 7 is a fragmentary view in section of a further modification corresponding in general to that of Fig. 2 adjusted as an oil scraper ring.

In considering the accompanying drawings, it should be borne in mind that no attempt has been made to show the parts in their relative proportions, or where associated with the piston and cylinder to show clearances, tolerances and relative dimensions. In all the figures the ring elements are shown in a considerably enlarged form.

Referring to the embodiment of the invention shown in Figs. 1 and 2, I represents a cylinder wall and 2 a piston having a ring groove 3 therein. Disposed in the groove 3 is a piston ring element embodying my invention and designated generally by the numeral 4. This ring element is of annular split form as shown in Fig. 1 and is formed of a flat strip or ribbon of ductile steel folded longitudinally upon itself to provide a plurality of integrally connected folds or plies of the general shape shown in cross section in Fig. 2. The folded strip is coiled edgewise into the general circular or annular shape shown in Fig. 1 to constitute an expansible split ring element which is radially resilient in cross section. The strip is folded to provide inner and outer axially extending flange-like members 5 and 6, respectively, and a plurality of intermediate loop-like folds 7.

The outer axially disposed member 6 has an outwardly turned peripheral edge 8 constituting an annular cylinder wall engaging member. This edge or wall engaging member has a chrome plating 9 extending continuously around the ring element. The inner member 5 is adapted to seat on the bottom or inner peripheral wall of the groove in which the ring is installed as shown in Fig. 2 with the bight portions of the intermediate members in coacting relation with the side walls 10 and 11 of the piston ring groove. The radial dimension of the ring element is sufficiently greater than that of the ring groove so when the ring is installed in the groove in operative relation to a cylinder, radial pressure is exerted by the ring against the cylinder wall and this radial pressure results without the necessity of using an expander. However, fillers or expanders may be used as where the ring is installed in a groove of greater depth than that for which it was designed or intended. The loops or folded members 7 are disposed in bellow-like formation and act with a general bellow-like action. Each bight or connection portion 12 of the loops 7 extends continuously in a plane the full length of the ring element to provide continuous axial coaction or supported engagement with the side walls of the groove.

In the embodiments shown in Figs. 3 and 4, the strip or ribbon of ductile metal is bent or folded longitudinally upon itself to provide the inner flange-like member 13 adapted to seat on the bottom of the piston ring groove, the outer flange-like member 14 having the outturned edge 15 cylinder wall engaging member which is provided with chrome plating 16. The bight portion 17 of the intermediate fold or portion 18 is flattened and constitutes the upper side wall of the ring element for engagement with coaction with the upper wall of a ring groove and the flattened parts 22 coact with the lower wall of the groove. The side members 19 and 20 of the loop 18 are converged or bent towards each other but not brought into contact with their adjacent portions 21 so that the ring element is radially springable or resilient. As shown in Fig. 3, the ring element is adapted to operate as a compression ring or compression check element. When the outer cylinder wall engaging element is directed downwardly as shown in Fig. 2, it serves as a scraper ring element.

In the modification shown in Figs. 5 and 6, the outer peripheral member 23 has annular peripheral corrugations 231 forming axially spaced annular ribs, the crowns of which are provided with a chrome plated surface 24. The ring element of Figs. 5 and 6 is otherwise substantially that of Figs. 3 and 4.

In the modification shown in Fig. 7, the ring element designated generally by the numeral 25 is substantially the same as that shown in Figs. 1 and 2 with the exception that the outer cylinder wall engaging member 26 is designed to bear against the cylinder wall as shown in the drawing, that is, it does not have the outturned edge or cylinder wall engaging member 8 of Fig. 2.

Figure 8:
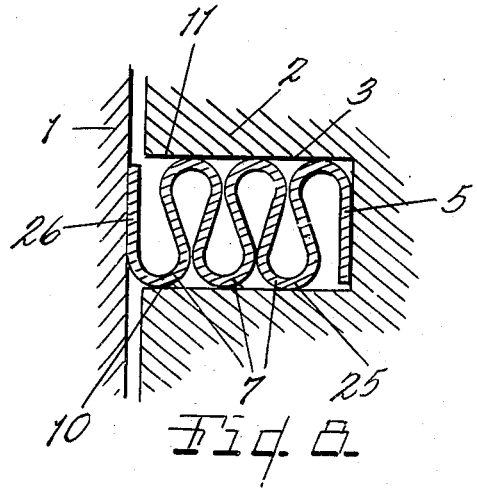
Fig. 8 is a similar view to that of Fig. 7 with the ring adapted as a compression ring.

In Fig. 8, the ring element is the same as shown in Fig. 7 except that it is reversed to serve as a compression check ring.

Figure 9:
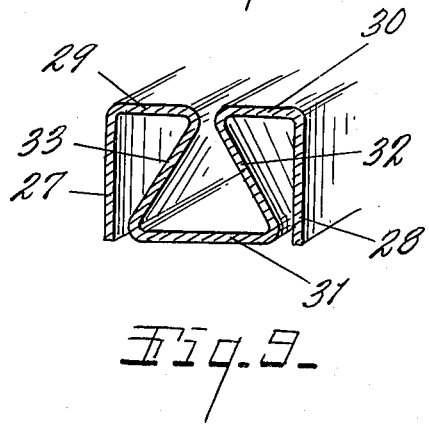
Fig. 9 is a sectional view of another form or embodiment of my invention adapted as a scraper ring.

In the embodiment shown in Fig. 9, the strip of ductile metal is bent or conformed to provide a cylinder wall engaging element 27 and the inner element 28 is adapted to seat upon the bottom of the groove or to be supported on an expander if that is desired. The upper side members 29 and 30 coact with the upper wall of the groove while the lower side member 31 coacts with the lower wall of the groove. These are connected by the intermediate walls 32 and 33. This modification corresponds in general to that shown in Fig. 3 with the exception that it does not have the outturned chrome plated cylinder wall engaging edge or member of that embodiment.

Figure 10:
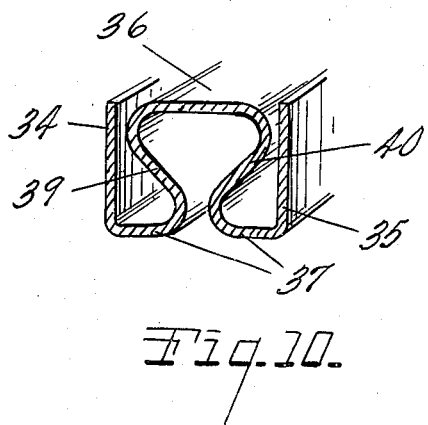
Fig. 10 is a further modification adapted as a compression ring.

The embodiment of my invention shown in Fig. 10 is particularly designed for use as a compression or compression check ring and the outer cylinder wall engaging member 34 is directed upwardly. The inner member 35 is adapted to seat on the bottom of the groove or to coact with the expander. The bight portion 36 of the intermediate fold is on the upper side of the ring and is adapted to coact with the upper wall of the ring groove while the lower side of the ring is constituted by the parts 37 connecting the walls 39 and 40 to the inner and outer members. The ring element of each of the embodiments is of resilient sheet steel and generally the shapes illustrated provide structures which are radially resilient and eliminate the necessity for expander springs although expander springs may be used if desired and they may be desirable where the rings are installed in grooves of a substantially greater depth than the rings are designed for or groove fillers may be used in such conditions. The structure is well adapted for use in worn cylinders or cylinders that are tapered or out-of-round.

The embodiments shown in Figs. 1 to 6, inclusive, are particularly well adapted for having the cylinder wall engaging portions chrome plated and they provide restricted and substantial line contacts for the rings with the cylinder wall which results in relatively high unit pressure as well as effective sealing action.

The ring elements of the present invention being of ductile sheet metal may be readily conformed to shape. For example, the ring elements may be formed of a flat strip or ribbon of steel folded longitudinally upon itself into a plurality of integrally connected folds or plies by being passed between any suitably shaped conforming rollers and thereafter coiled to a ring-like shape in a manner substantially similar to that described in Patent No. 2,404,862.

I have illustrated and described practical embodiments of the invention. I have not attempted to illustrate or describe other embodiments or adaptations as it is believed this disclosure will enable those skilled in the art to embody or adapt the invention as may be desired.

Having thus described my invention, what I claim as new and desire to secure by Letters Patent is:

1. A split resilient piston ring element formed of an integral ductile sheet metal ribbon-like member bendably folded along lines extending longitudinally of the member and coiled to a ring-like shape to provide concentric inner and outer members and to provide loop-like members concentric to and intermediate said inner and outer members, the outer members being peripherally corrugated and constituting a cylinder wall engaging member and the inner member being disposed for seated engagement with the inner peripheral wall of the piston ring groove with the bights of the loop-like members in cooperating relation to the opposite side walls of the groove, said loop-like members being of a bellows-like formation and disposed to resiliently support the cylinder wall engaging member, the crowns of the corrugations of the cylinder wall engaging member being chrome plated.

2. A split resilient piston ring element formed of an integral ductile sheet metal ribbon-like member bendably folded along lines extending longitudinally of the member and coiled to a ring-like shape to provide concentric inner and outer members and to provide loop-like members concentric to and intermediate said inner and outer members, the outer member being peripherally corrugated and constituting a cylinder wall engaging member and the inner member being disposed for seated engagement with the inner peripheral wall of the piston ring groove with the bights of the loop-like members in cooperating relation to the opposite side walls of the groove, said intermediate members acting to radially resiliently support the cylinder wall engaging member, the crowns of the corrugations of the cylinder wall engaging member being chrome plated.

3. A split resilient piston ring element formed of an integral ductile sheet metal ribbon-like bendably folded member along lines extending longitudinally of the member and coiled to a ring-like shape to provide concentric inner and outer members and to provide loop-like members concentric to and intermediate said inner and outer members, the free edge of the outer member being turned outwardly constituting a cylinder wall engaging member and the inner member being disposed for seated engagement with the inner peripheral wall of the piston ring groove with the bights of the loop-like members in cooperating relation to the opposite side walls of a piston ring groove, said loop-like members being of a bellows-like formation and disposed to resiliently support the cylinder wall engaging member, the outturned edge of the cylinder wall engaging member being chrome plated.

4. A split resilient piston ring element formed of an integral ductile sheet metal ribbon-like member bendably folded along lines extending longitudinally of the member and coiled to a ring-like shape to provide concentric inner and outer members and to provide loop-like members concentric to and intermediate said inner and outer members, the free edge of the outer member being turned outwardly constituting a cylinder wall engaging member and the inner member being disposed for seated engagement with the inner peripheral wall of the piston ring groove with the bights of the loop-like members in cooperating relation to the opposite side walls of a piston ring groove, said intermediate members acting to radially and resiliently support the cylinder wall engaging member, the outturned edge of the cylinder wall engaging member being chrome plated.

5. A split annular resilient piston ring element formed of ductile ribbon steel bendably folded along lines extending longitudinally thereof to provide inner and outer members and intermediate loop-like members, the outer member being of flange-like generally cylindrical shape and peripherally corrugated and constituting a cylinder wall engaging member, the crowns of the corrugation being chrome plated.

6. A split annular resilient piston ring element formed of ductile ribbon steel bendably folded along lines extending longitudinally thereof to provide inner and outer members and intermediate loop-like members, the outer member being of flange-like generally cylindrical shape and constituting a cylinder wall engaging member, its edge being turned outwardly and having chrome plating thereon.

7. An annular split piston ring element formed of ductile sheet metal bendably folded along lines extending longitudinally thereof to provide concentric inner and outer flange-like members and to provide radially springable intermediate loop-like members, the edge of the outer member being turned outwardly and having chrome plating thereon and constituting a cylinder wall engaging element.

8. An annular split piston ring element formed of ductile sheet metal bendably folded along the lines extending longitudinally thereof to provide concentric inner and outer members and intermediate loop-like connecting members therefor, the outer member having peripheral axially spaced corrugations providing annular cylinder wall engaging ribs, the crowns of the corrugations being chrome plated throughout.

9. An annular split piston ring element formed of ductile sheet metal bendably folded along the lines extending longitudinally thereof to provide concentric inner and outer members and intermediate loop-like connecting members therefor, the outer member having a cylinder wall engaging rib, the rib being chrome plated.

10. A split resilient piston ring element formed of an integral ductile sheet metal ribbon-like member bendably folded along lines extending longitudinally of the member to provide concentric outer and inner walls, and to provide loop-like members concentric to and intermediate said inner and outer walls, the outer wall constituting a cylinder wall engaging member, the bights of the loop-like members being disposed to engage the opposite side walls of a piston ring groove, one of the side edges of the cylinder wall engaging member being disposed to move with a spring-like action relative to the bight of the adjacent loop-like member.

11. A split resilient piston ring element formed of an integral resilient ductile sheet metal member bendably folded to provide concentric inner and outer walls, a loop-like member intermediate the inner and outer walls and portions connecting the legs of the loop-like members to the inner and outer walls, the outer wall constituting a cylinder engaging wall, the bight of the loop being flat and constituting a ring element side wall for engaging one of the side walls of a ring groove, said connecting portions being flat and constituting another ring element side wall for engaging the opposite side of a ring groove, one of the side edges of the cylinder engaging wall being disposed to move with a spring-like action relative to the bight of the intermediate loop.

12. A split resilient piston ring element formed of an integral resilient ductile sheet metal member bendably folded to provide concentric inner and outer walls, a loop-like member intermediate the inner and outer walls and portions connecting the legs of the loop-like member to the inner and outer walls, the outer wall constituting a cylinder engaging wall, the bight of the loop being flat and constituting a ring element side wall for engaging one of the side walls of a ring groove, said connecting portions being flat and constituting another ring element side wall for engaging the opposite side of a ring groove.

13. A split resilient piston ring element formed of ductile sheet metal folded to provide an outer cylinder wall engaging member, an inner loop-like member and a portion connecting one of the legs of the loop-like member to the cylinder engaging wall, the bight of the loop constituting a ring element side wall for engaging one of the side walls of a ring groove, said connecting portion constituting another ring element side wall for engaging the opposite side wall of a ring groove, the bight of the loop supportingly engaging the cylinder wall adjacent one of the side edges of the cylinder wall.

14. A split resilient piston ring element formed of ductile sheet metal folded to provide a cylinder engaging wall, opposite side wall portions for engaging opposite side walls of a ring groove and a portion for supportingly connecting said opposite side wall portions radially inwardly of said cylinder engaging wall, said cylinder engaging wall being connected along one of its opposite sides edges to one of the opposite side wall portions, the opposite side edge of the cylinder engaging wall being disposed to move radially relative to the adjacent side wall portion.

15. A split resilient piston ring element comprising a cylinder engaging wall, opposite side walls for engaging the opposite side walls of a ring groove, and means for supportingly connecting the opposite side walls, said connecting means being disposed radially inwardly of said cylinder engaging wall, said cylinder engaging wall being formed of a resilient sheet metal member and connected along one of its opposite side edges to one of the opposite side walls of the ring element, the opposite side edge of the cylinder engaging wall being disposed to move radially of the ring element relative to the adjacent side wall of the ring element.

HAROLD P. PHILLIPS.

References Cited in the file of this patent

UNITED STATES PATENTS

| Number | Name | Date |
| --- | --- | --- |
| 1,796,882 | Bowers | Mar. 17, 1931 |
| 2,466,474 | Phillips | Apr. 5, 1949 |
| 2,569,778 | Phillips | Oct. 2, 1951 |